US006971867B2

(12) United States Patent
Ihara et al.

(10) Patent No.: US 6,971,867 B2
(45) Date of Patent: Dec. 6, 2005

(54) RECOVERY APPARATUS OF MOLDED PARTS

(75) Inventors: Hirokazu Ihara, Nagano-ken (JP); Nobuyuki Kawahara, Nagano-ken (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 52 days.

(21) Appl. No.: 10/196,098

(22) Filed: Jul. 16, 2002

(65) Prior Publication Data

US 2003/0017226 A1    Jan. 23, 2003

(30) Foreign Application Priority Data

Jul. 19, 2001 (JP) ............................. 2001-219649

(51) Int. Cl.[7] ............................................. B29C 45/84
(52) U.S. Cl. .................. 425/403.1; 221/270; 425/404; 425/445
(58) Field of Search ............................. 425/403.1, 404, 425/445; 221/268, 270

(56) References Cited

U.S. PATENT DOCUMENTS

| 2,995,775 | A | * | 8/1961 | Schnitzius et al. .......... 425/217 |
| 3,561,352 | A | * | 2/1971 | Hirsch ......................... 100/351 |
| 3,776,675 | A | * | 12/1973 | Veneria ....................... 425/139 |
| 4,946,357 | A | * | 8/1990 | Harrison ...................... 425/182 |
| 5,286,321 | A | * | 2/1994 | Fuss ............................. 156/84 |
| 5,340,949 | A | * | 8/1994 | Fujimura et al. ........ 177/25.18 |
| 5,439,634 | A | * | 8/1995 | North .......................... 264/334 |
| 5,487,459 | A | * | 1/1996 | Farmont ...................... 194/213 |
| 5,665,395 | A | * | 9/1997 | Quichaud et al. ............. 425/73 |
| 2002/0096470 | A1 | * | 7/2002 | Cook et al. .................. 210/490 |

FOREIGN PATENT DOCUMENTS

| JP | 3006499 | 1/1995 |
| JP | 2001-138367 | 5/2001 |

* cited by examiner

Primary Examiner—Robert Davis
Assistant Examiner—Emmanuel S. Luk
(74) Attorney, Agent, or Firm—Weingarten, Schurgin, Gagnebin & Lebovici LLP

(57) ABSTRACT

Thin and light molded parts released from a die are prevented from sticking by static electricity, by forming the recovery chute of molded part with fine wire gauze. The recovery receptacle 16, 17 for molded parts, molded parts introduction tube 23 and recovery cup 24 of rejected molded parts are made respectively by forming into a cylindrical shape with a wire gauze, metal lath, or punching plate.

1 Claim, 3 Drawing Sheets

RECOVERY APPARATUS OF MOLDED PARTS

BACKGROUND OF THE INVENTION

1. Field of the Invention

The present invention concerns a molded part recovery apparatus for securely collecting thin, light and electrostatically charged molded parts released from the die, and especially midget molded parts.

2. Detailed Description of the Prior Art

Molded parts made of LCP liquid crystal polymer tend to be electrically charged when they are released form the die, and thin and light midget molded parted parts of the order of 0.01 to 0.03 g, for example small and narrow pitch connectors, often deposit on the die surface or the surface or others of a chute installed under the die opening area of the mold clamp apparatus by static electricity impeding to fall by the own weight to the recovery receptacle.

This attachment phenomenon can be reduced by blowing intensively an ionized air at the same time as the ejector, and the air blow tends to scatter molded parted parts, and did not lead to the solution of deposit of scattered molded parts. The deposit of these scattered molded parts onto the chute is not favorable in a "quality discrimination reversing chute" provided with a function to segregate good molded parts from defective molded parts upon reception of signal from a molding machine before recovery, molded parts attach before arriving at the segregation means and they are caught in the midway; consequently good and defective molded parts are mixed inconveniently, making impossible to accomplish this function.

This invention has been devised from the aforementioned situation, and has an object to provide a novel molded part recovery apparatus comprising a recovery chute that can prevent thin and light molded parts, such as midget molded parts released from a die, from electrostatic attachment by an extremely simple means, and prevent molded parts from being blown up by the air blow during detachment from a die, allowing to introduce securely all of molded parts into the recovery receptacle each time they are released from the die.

SUMMARY OF THE INVENTION

This invention according to the aforementioned object comprises a recovery receptacle disposed under the die opening area of a mold clamp apparatus, and a molded part recovery chute installed at the upper portion of the recovery receptacle is composed of a fine mesh wire gauze.

Moreover, the recovery apparatus of the present invention comprises an installation plate that can be received in a machine base recess under the die opening area of a mold clamp-apparatus, a moving plate installed reciprocally movable on the installation plate, a plurality of recovery receptacles with upper opening installed detachably by arranging on the top face of the moving plate, a switching plate having a through hole installed slidably on the upper portion of the recovery receptacle, a molded part introduction tube installed on the top face of the switching plate superposing on the through hole, a recovery cup of rejected molded parts juxtaposed to the introduction tube, a hopper shaped chute of molded parts made of fine mesh wire gauze installed on the introduction tube upper portion, and an air cylinder for reciprocally moving respectively the aforementioned moving plate and switching plate, and the aforementioned recovery receptacle and introduction tube and recovery cup are made respectively by forming into a cylindrical shape with a wire gauze, metal lath, punching plate, or others.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENT

Figure 1:
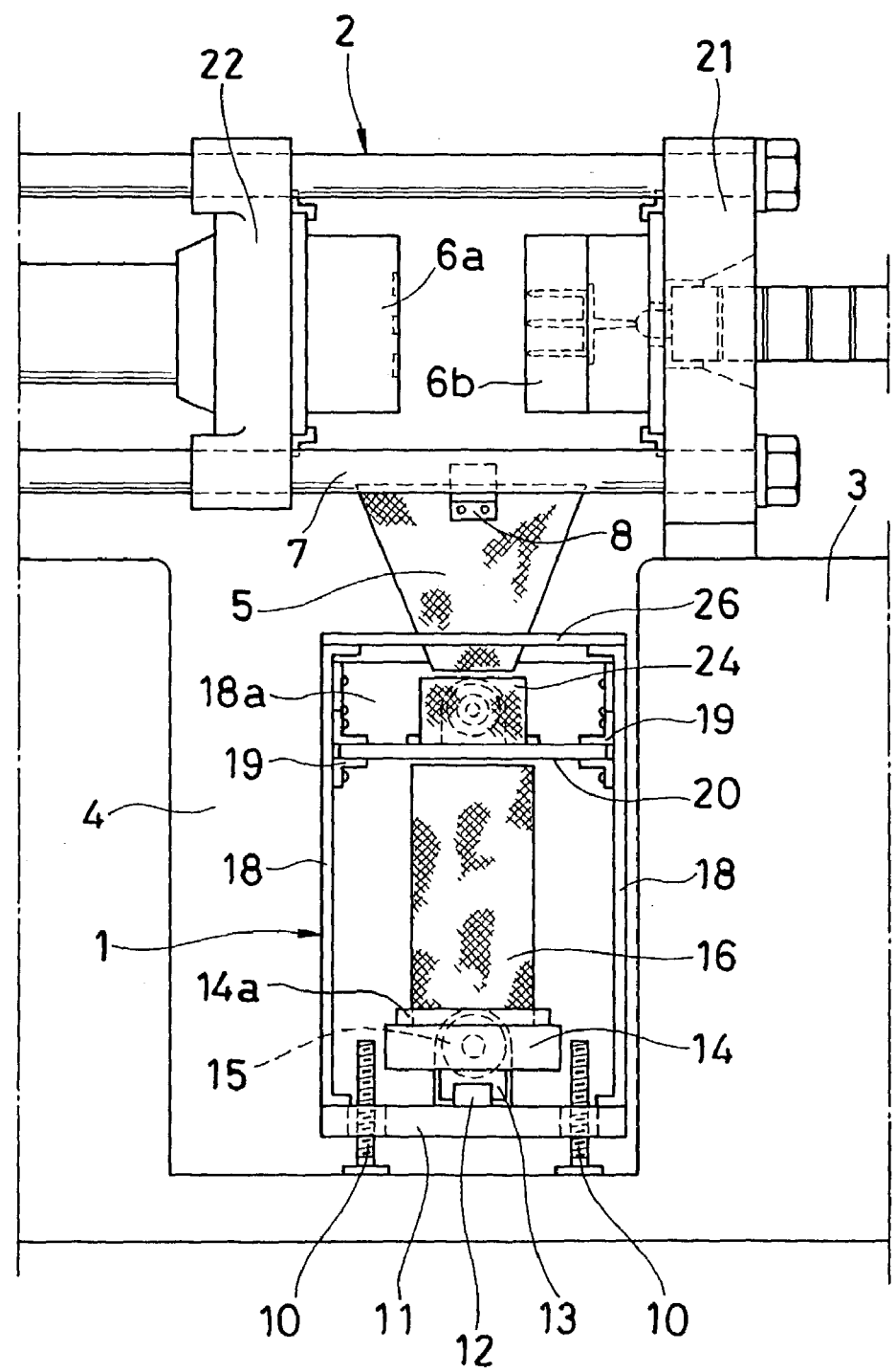
FIG. 1 is a partial side view of a molding machine having a recovery apparatus of molded parts according to the present invention, installed in the machine base recess.
Figure 2:
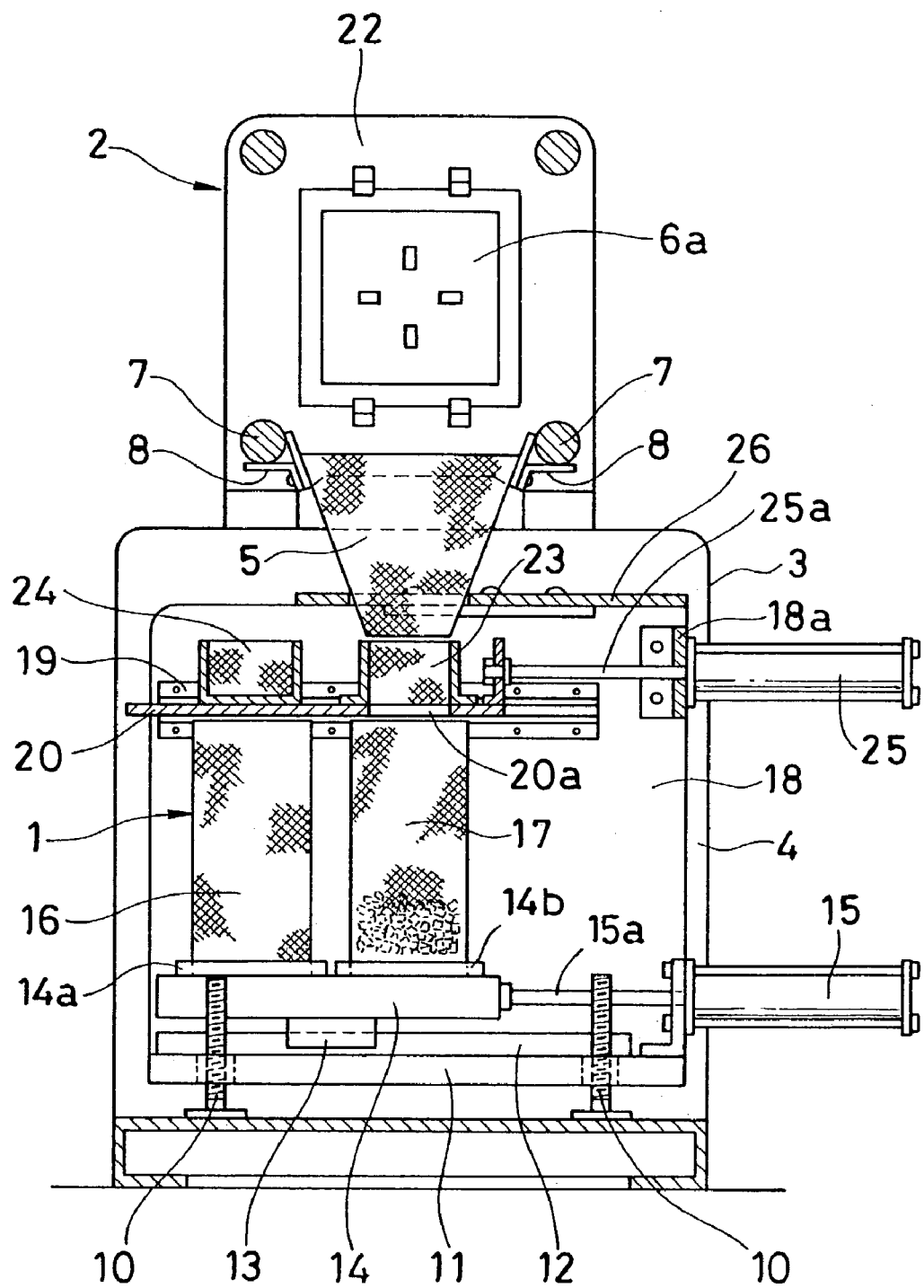
FIG. 2 is a longitudinal sectional view of the same.
Figure 3:
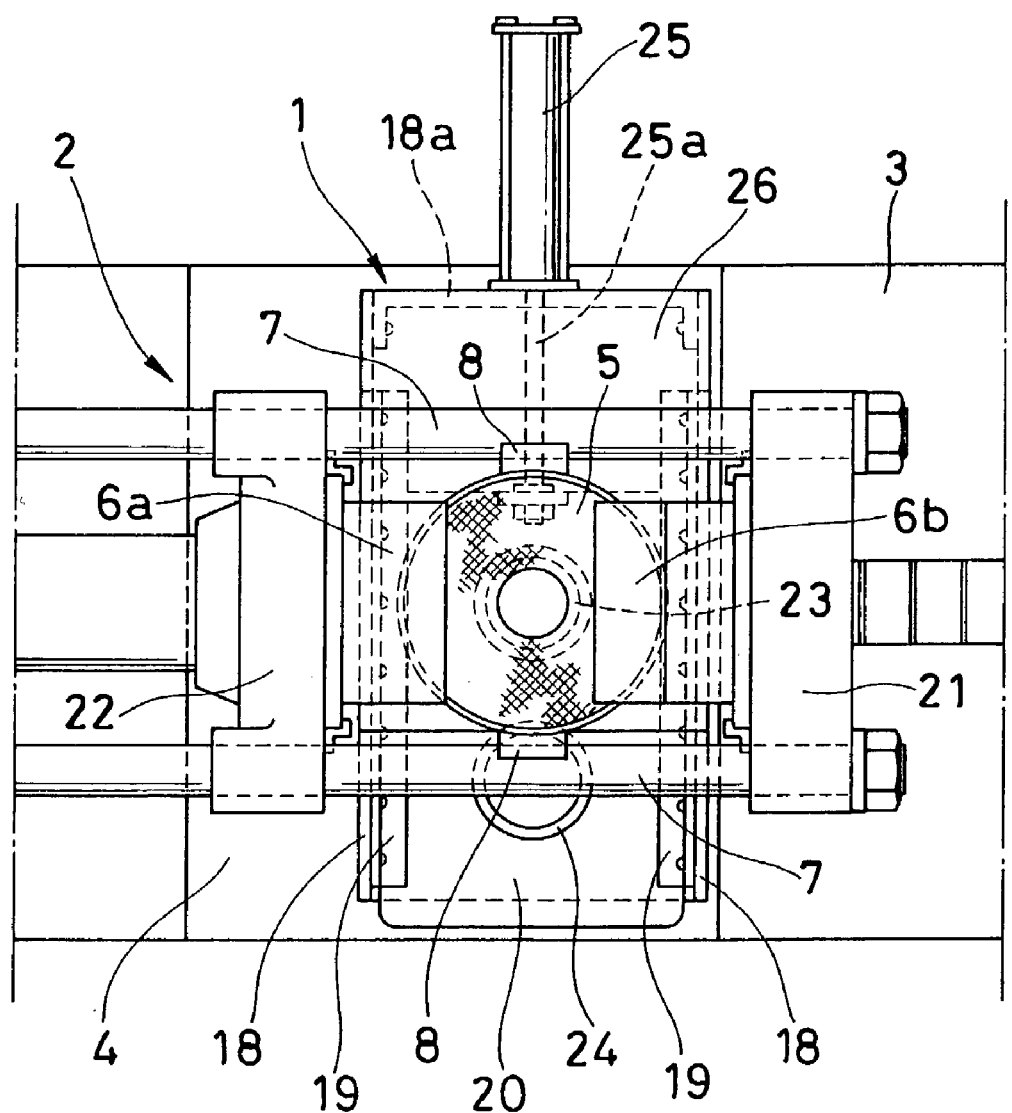
FIG. 3 is a plane view of the same.

In the drawing, 1 is a recovery apparatus, installed in a recess 4 of a machine base 3 formed under the die opening area of a fixed plate 21 and a movable platen 22 of a mold clamp apparatus 2.

5 is a molded part recovery chute, made by forming wire gauze having a fine mesh into a hopper shape. This recovery chute 5 is installed on the upper portion of the recovery apparatus 1 by hooking by metal fittings 8, 8 on a lower tie bar 7, 7 at both sides of the die opening area, so as to be positioned just under between opened dies 6a, 6b.

As for metallic material of the wire gauze composing the aforementioned chute, stainless steel wire, copper wire or copper alloy wire, plated steel wire or others are preferable, and a preferable mesh size is obtained by knitting a fine wire of 0.2 to 0.3 mm in thickness into a net of 18 to 25 mesh. With the wire diameter and mesh size of this order, the attachment to the recovery chute 5 by the static electricity generated in the molded part does not occur at all, even for thin and light midget molded parts of the order of 0.01 to 0.03 g in weight, as the contact with the wire gauze becomes punctual and not full facial.

In addition, as the wire gauze made of fine wire is resilient, event when the upper opening edge is pressed and deformed by a movable platen side die 6a during the die compression, it restores during the mold open enabling to maintain an opening portion sufficient for collecting all molded parts scattering from the die 6a and falling between dies.

Said recovery apparatus 1 comprises an installation plate 11 having a size to be received in the recess 4 of the machine base 3 and support legs 10, 10, a movable plate 14 installed reciprocally movably on the installation plate by fitting a slider 13 with a guide rail 12 on the top face thereof, an air cylinder 15 at the end portion of the installation plate coupling a piston rod 15a with the moving plate 14 by fixing at the end portion of the installation plate 11, a pair of upper opening cylindrical recovery receptacles 16, 17 mounted on the moving plate 14, by detachably fitting into annular seats 14a, 14b in the movement direction juxtaposed on the moving plate 14, guide members 19, 19 mounted long laterally in the movement direction and opposed horizontally in the upper portion inside of both side plates 18, 18 of the installation plate 11, a switching plate 20 having both edges inserted slidably in the guide members and a through hole 20a disposed at the upper portion of the recovery receptacle 16, 17, an introduction tube 23 under the recovery chute installed on the tope face of the switching plate 20 superposing on the through hole 20a, a recovery cup 24 of inferior molded parts adjacent to the introduction tube 23, an air cylinder 25 coupling the piston rod 25a with the switching plate 20 by fixing on a support plate 18a attached across both side plates 18, 18 and an upper cover 26.

This upper cover 26 prevents strange matters or defective molded parts from jumping into the introduction tube 23 and entering the recovery receptacle 16, 17, when the switching plate 20 is switched overt to the side of recovery cup 24 of defective molded parts. Though, in the drawing, the aforementioned recovery chute 5 is fixed to the tie bar 7, 7, the upper cover 26 may be fixed to the recovery chute 5, to omit fixing to the tie bar side.

Each of the aforementioned recovery receptacle 16, 17 and introduction tube 23, recovery cup 24 is made by forming a plate shape element having innumerable vent holes in the plane such as wire gauze or metal lath, punching plate, or others into a cylindrical shape, allowing to remove static electricity charged on the molded part, by blowing an air ionized by an ionizer from outside to inside through the vent holes.

Though not shown in the drawing, an ordinary quality discrimination apparatus for dividing molded parts for each shot into good and defective molded parts upon reception of a signal from the molding machine is provided at the narrow exit of the aforementioned recovery chute 5. Each time when the signal from the molding machine is input, the quality discrimination apparatus activates the aforementioned air cylinder 25 and moves the switching plate 20 reciprocally, and in case of good molded part, the introduction tube 23 moves until it faces on the exit of the recovery chute 5.

On the other hand, in case of defective molded part, the recovery cup 24 moves until facing on the exit of the recovery chute 5. Such operation of the switching plate 20 allows to divide and recovery good and defective molded parts securely.

In case of permitting to sample molded parts, though not shown in the drawing, the switching plate 20 is prolonged forward longer than as shown in the drawing, and a sampling cup is provided on the top face of the prolonged area, and it is made possible only by setting to move in three steps by replacing the air cylinder 25 and piston rod 25a by those having a longer stroke. Timing and number of times of this sampling are determined by the production control procedures.

In the recovery apparatus of the aforementioned composition, starting from the recovery chute 5, each of recovery receptacle 16, 17 and introduction tube 23, recovery cup 24 aerates and consequently, even when the air ionized during the removal from the die is blown downward strongly from a nozzle between dies (not shown), most of this air is blown out from the mesh of the recovery chute 5 and lowered, preventing the air flow from being disturbed by the chute surface, and molded parts from being scattered even if they are thin and light.

Further, as air flows outside from the introduction tube 23 and the recovery receptacle 16, 17, they are not blown up in the introduction tube 23, and whole the quantity thereof is received securely in the recovery receptacle 16, 17. Defective molded parts are similarly received in the recovery cup 24. In addition, if air ionized by an ionizer is at all times blown to the recovery receptacle 16, 17 from outside, molded parts in the recovery receptacle can be taken out easily, as the molded parts come into contact with the air flowing inside from the vent hole and prevent attachment by static electricity.

It should be appreciated that, in the drawing, a plurality of recovery receptacles 16, 17 are replaced by hands, and the recovery receptacles 16, 17 are replaced by activating the air cylinder 15 upon a production complete signal from a molding machine; however, though not shown, it is also possible to exchange the recovery receptacle automatically, by installing a rotation table on the moving plate top face, disposing recovery receptacles concentrically on all sides on the rotation table, placing respective one just under the recovery chute 5 and rotating the rotation table by 90 degrees upon the production complete signal from the molding machine.

While the presently preferred embodiment of the present invention has been shown and described, it will be understood that the present invention is not limited thereto, and that various changes and modifications may be made by those skilled in the art without departing from the scope of the invention as set forth in the appended claims.

What is claimed is:

1. A recovery apparatus of thin and light electrostatically charged molded parts comprising:
    an installation plate that can be received in a machine base recess under a die opening area of a mold clamp apparatus,
    a moving plate installed reciprocally movable on the installation plate,
    a plurality of recovery receptacles with upper opening detachably juxtaposed on a top face of the moving plate,
    a switching plate having a through hole installed slidably on the upper portion of the recovery receptacle,
    a molded part introduction tube installed on the top face of the switching plate superposing on the through bole,
    a recovery cup of rejected molded parts on the top face of the switching plate juxtaposed to the introduction tube,
    a hopper shaped chute of molded parts or rejected molded parts made of fine mesh wire gauze of a fine wire of 0.2 to 0.3 mm in thickness and having 18 to 25 mesh installed on the introduction tube upper portion,
    an air cylinder for reciprocally moving the moving plate for replacing the recovery receptacles, and
    an air cylinder for reciprocally moving the switching plate to the point where the molded part introduction tube or the recovery cup of rejected molded parts faces the exit of the chute,
    wherein the recovery receptacle, the introduction tube and the recovery cup comprise a wire gauze having a cylindrical shape.

\* \* \* \* \*